(12) United States Patent
Chen et al.

(10) Patent No.: US 7,611,241 B2
(45) Date of Patent: Nov. 3, 2009

(54) SPECTACLE WITH AN ILLUMINATION DEVICE

(75) Inventors: Hsin Chen, 6F., NO. 167, Sec. 1, Hsin Min St., Tan Shiu Chen, Taipei Hsien (TW); Hsu-Ying Chang, Taichung (TW)

(73) Assignees: Hsin Chen, Taipei Hsien (TW); Yo-Yu Liu, Taipei Hsien (TW)

( * ) Notice: Subject to any disclaimer, the term of this patent is extended or adjusted under 35 U.S.C. 154(b) by 0 days.

(21) Appl. No.: 12/047,325

(22) Filed: Mar. 13, 2008

(65) Prior Publication Data

US 2009/0231540 A1  Sep. 17, 2009

(51) Int. Cl.
*G02C 1/00* (2006.01)
(52) U.S. Cl. .................................. 351/158; 351/41
(58) Field of Classification Search .......... 351/158, 351/41; 362/103, 105, 800
See application file for complete search history.

(56) References Cited

U.S. PATENT DOCUMENTS

| 5,381,263 | A | * | 1/1995 | Nowak et al. | 359/411 |
| 6,612,696 | B2 | * | 9/2003 | Waters | 351/158 |
| 2008/0068824 | A1 | * | 3/2008 | Wang | 362/103 |

* cited by examiner

*Primary Examiner*—Hung X Dang
(74) *Attorney, Agent, or Firm*—Leong C. Lei

(57) ABSTRACT

A spectacle with an illumination device is disclosed. The spectacle comprises a body and a clipping device, and the front section of the body is provided with an illumination device. The interior of the body contains batteries connected to the illumination device. The lateral side of the body has protrusion and the clipping device comprises a positioning element and a pivot connection to the securing element or a fastening element having elasticity being extended from the positioning element such that when the clipping device clips to the body, the spectacle is provided with an illumination effect. The positioning element has protrusions being mounted with the lug to provide up and down angle adjustment of the body.

4 Claims, 11 Drawing Sheets

SPECTACLE WITH AN ILLUMINATION DEVICE

BACKGROUND OF THE INVENTION (a) Technical Field of the Invention

The present invention relates to structure of a spectacle, and in particular, a spectacle with an illumination device.

(b) Description of the Prior Art

When working under darkness or under low light environment, other than using a torchlight so that the lighting source can be moved from one place to another, if a fixed light has to be secured at a fixed place, it is generally not convenient if the worker needs to move from one place to another. However, if torchlight is used, only one hand is free and available as the torch light is hold by the other hand. A fixed point illumination allows both hands to do the job, but if it needs to be moved from one place to another, the changing of illumination so that it could be secured to a particular place is laborious. In view of the above, it is an object of the present invention to provide a spectacle with an illumination device which mitigates the drawback.

SUMMARY OF THE INVENTION

The primary purpose of the present invention is to provide a spectacle with an illumination device comprising a body having a light-emitting element mounted at the front section of the body, and the interior section of the body contains batteries which are connected to the light-emitting element, and protrusion formed at the lateral side of the body; a clipping device comprising a positioning element and a fastening element, wherein the positioning element is provided with a seat body having forward extending lugs from the two lateral sides of the seat body and a downwardly extended securing rod, wherein the seat body is provided with an engaging slot and the fastening element is provided with two folded clipping rods, a triggering plate links the two clipping rods such that the end section of the two clipping rods, after passing through a spring, is positioned at the slot of the seat body, thereby the spring causes the clipping rods to tightly clip at the securing rod, and the lugs, after in engagement with the protrusion, the clipping rod and the securing rod are used to hold the spectacle so as to provide an illumination, and to provide an up and down angle adjustment of the body.

Yet still another object of the present invention is to provide a spectacle with an illumination device comprising a body having a light-emitting element at the front section of the body, and the interior section of the body containing batteries connected to the light-emitting element and protrusion at the lateral side of the body; a clipping device comprising a positioning element and a fastening element, wherein the positioning element is provided with a securing plate having two lateral sides at the front edge being extended to form two lugs, and the rear edge being mounted with a pivot rod, and the fastening element being a triggering plate corresponding to a connection rod of the pivot rod of the securing plate such that after the connection rod and the pivot rod are stacked, a securing nut passes through the connection rod and the pivot rod and a spring, and the spring causes the trigger plate to tightly clip to the securing plate, and the clipping device upon the lug being mounted to the protrusion of the body is clipped at the spectacle by means of the trigger plate and the securing plate to provide illumination and to provide an up and down angle adjustment of the body.

A further object of the present invention is to provide a spectacle with an illumination device comprising a body having a light-emitting element at the front section of the body, and the interior section of the body containing batteries connected to the light-emitting element and protrusion at the lateral side of the body; a clipping device comprising a positioning element and a fastening element, wherein the positioning element provided with two lateral sides at the front edge of the securing plate are extended to form two lugs, the fastening element is a securing plate with a folded upper edge and downwardly extended circular arch-shaped plate body, the plate body has an appropriate elasticity and the plate body is tightly clipped to the securing plate after the lug is being mounted to the protrusion of the body, the clipping device is mounted to the spectacle by means of the plate body and the securing plate to provide illumination, and to provide an up and down angle adjustment of the body.

Yet still a further object of the present invention is to provide a spectacle with an illumination device comprising a body having a light-emitting element at the front section of the body, and the interior section of the body containing batteries connected to the light-emitting element and protrusion at the lateral side of the body; a clipping device comprising a positioning element and a fastening element, wherein the positioning element is provided with a securing plate having two lateral sides at the front edge being extended to form two lugs, the fastening plate is formed from two clipping plates having a front plate body and a rear plate body, and the upper edge of the front plate body is folded and downwardly extended to form a circular arch-shaped plate body such that the two clipping plates are connected to the two ends of the securing plates, wherein the rear plate body of the folded plate is formed with an appropriate elasticity, and is clipped at the front plate body, the clipping device, after the lug is being mounted to the protrusions, is clipped to the spectacle by means of the front plate body and a rear plate body to provide illumination and to provide an up and down angle adjustment of the body.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
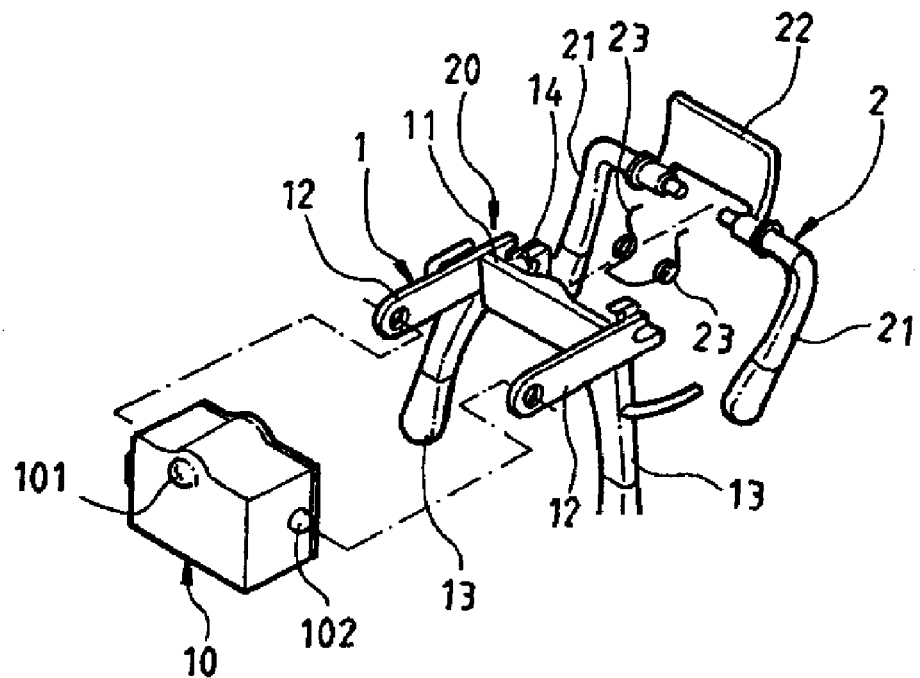
FIG. 1 is a perspective exploded view of a first preferred embodiment of the present invention.
Figure 2:
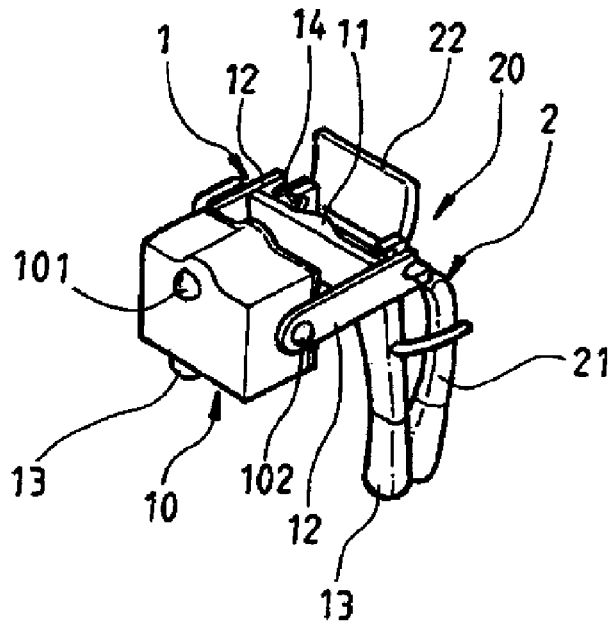
FIG. 2 is a perspective view of a first preferred embodiment of the present invention.
Figure 3:
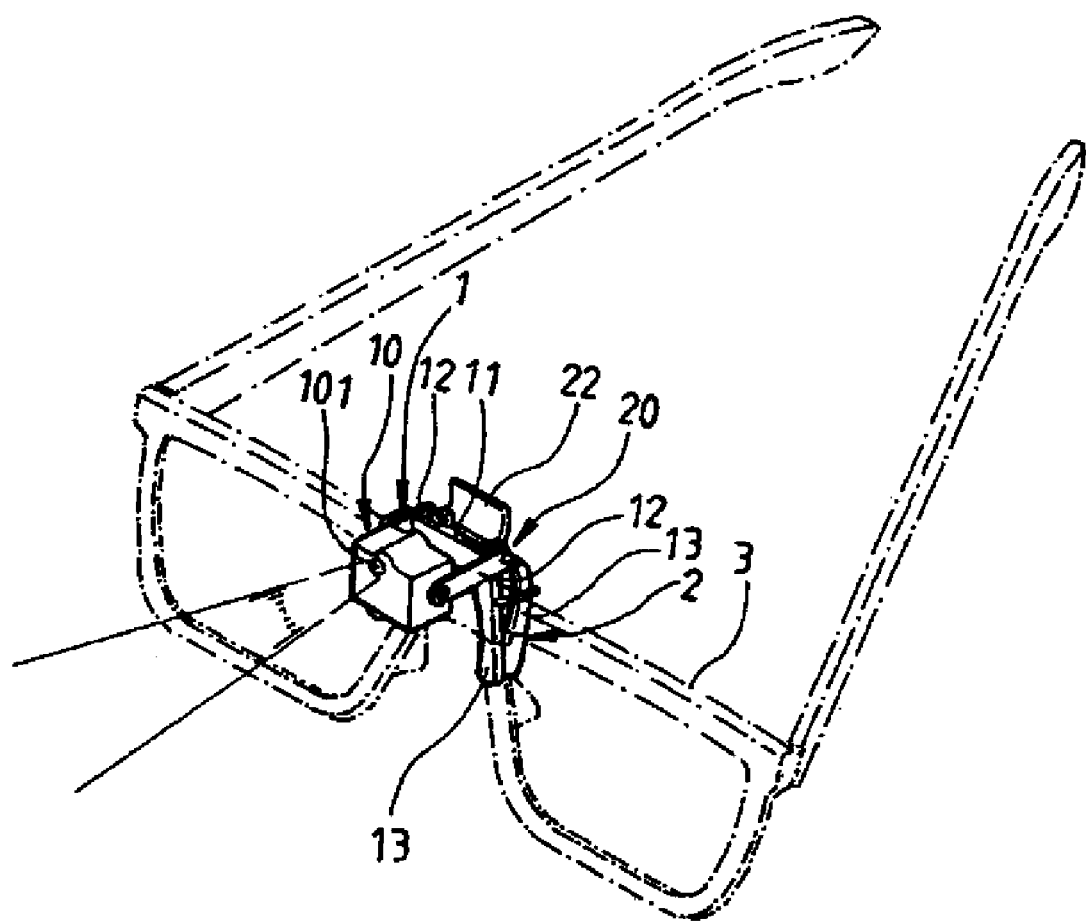
FIG. 3 is a schematic view showing the application of a first preferred embodiment of the present invention.

Referring to FIGS. 1, 2 and 3, there is shown a spectacle with an illumination device comprising a body 10 and a clipping device 20. On the body 10, a light-emitting element 101 is provided at the front section of the body 10, and the interior section of the body 10 is used to contain batteries connected to the light-emitting element 101 and protrusion 102 are provided at the lateral side of the body 10. The clipping device 20 has a positioning element 1 and an elastic fastening element 2 extended from the positioning element 1. The positioning element 1 is provided with a seat body 11, forming into the spectacle of the present invention. The clipping device 20 clips the spectacle 3 at the central thereof so as to provide illumination. In the first preferred embodiment, the positioning element 1 has a seat body 11 and the two lateral sides of the seat body 11 are extended to form two lugs 12 and have a downwardly extended securing rod 13. The seat body 11 is provided with an engaging slot 14 and the fastening element 2 is provided with two folded clipping rods 21. A triggering plate 22 links the two clipping rods 21 such that the end section of the two clipping rods 21 after passing through a spring 23 is positioned at the slot 14 of the seat body 11, thereby the spring 23 causes the clipping rod 21 to tightly clip at the securing rod 13, and the lug 12 after in engagement with the protrusion 102, the clipping rod 21 and the securing rod 20 are used to hold the spectacle 3 so as to provide an illumination. Thus, the spectacle provides an up and down angle adjustment of the body 10.

Figure 4:
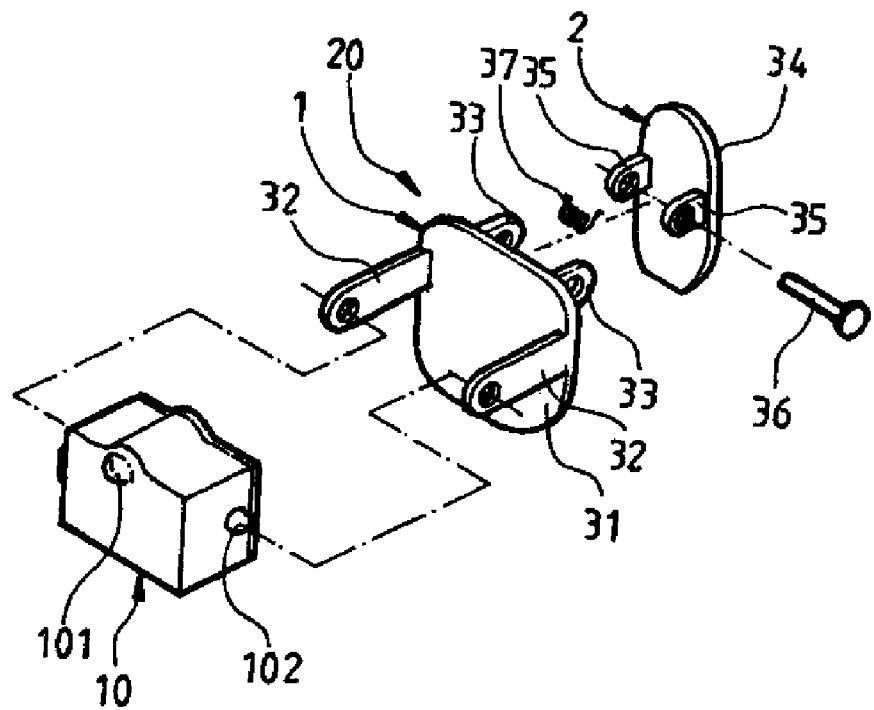
FIG. 4 is a perspective exploded view of a second preferred embodiment of the present invention.
Figure 5:
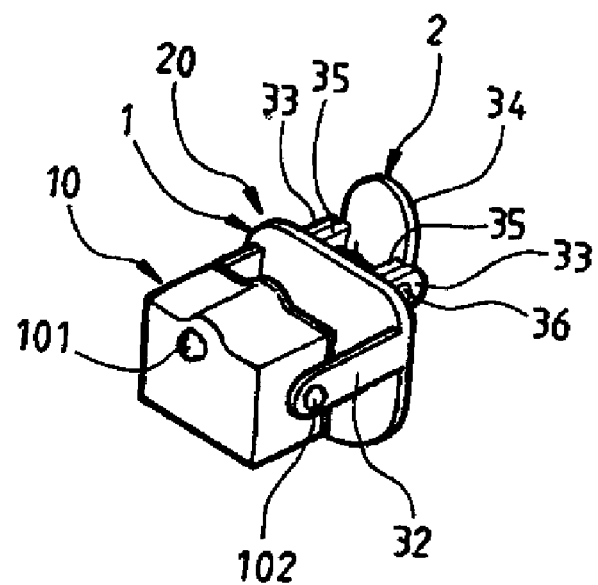
FIG. 5 is a perspective view of a second preferred embodiment of the present invention.
Figure 6:
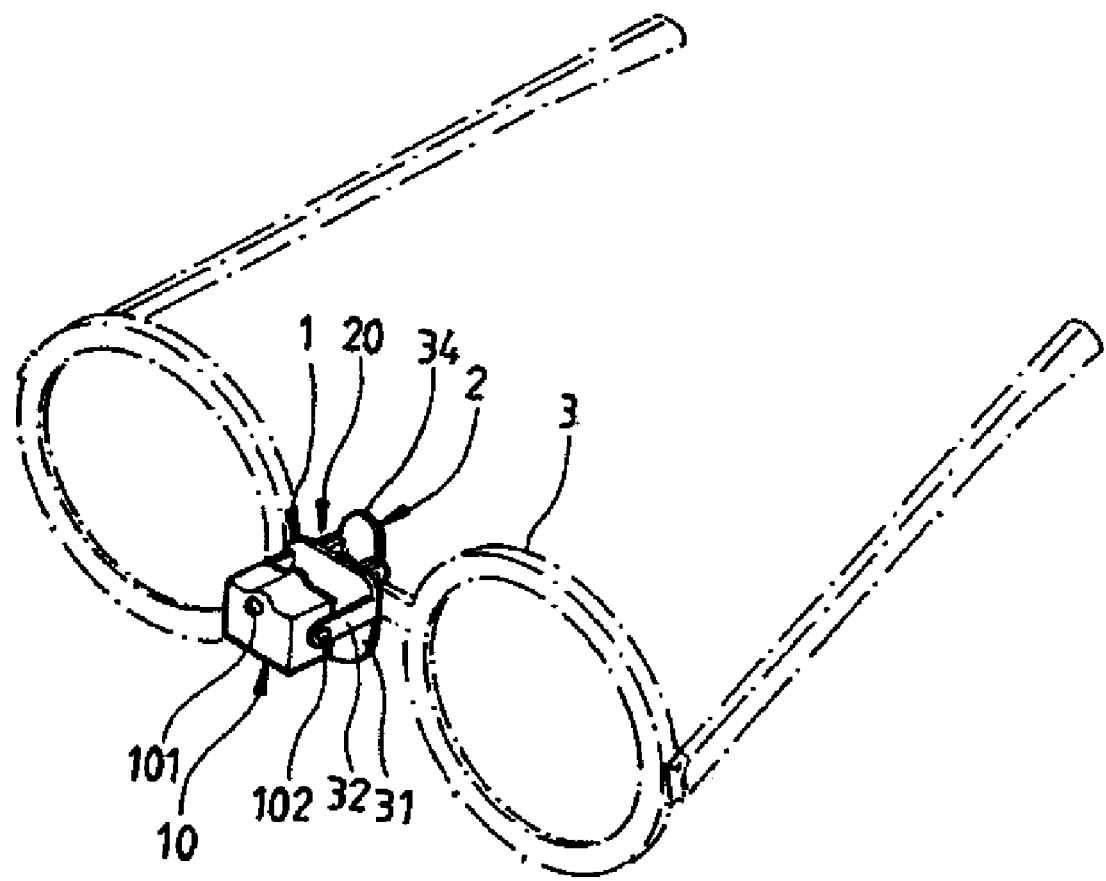
FIG. 6 is a schematic view showing the application of a second preferred embodiment of the present invention.

FIGS. 4, 5 and 6 illustrate a second preferred embodiment in accordance with the present invention. In this preferred embodiment, the positioning element 1 of the clipping device 20 is provided with a securing plate 31 having two lateral sides at the front edge being extended to form two lugs 32, and the rear edge is provided with a pivot rod 33, and the fastening element 2 has a triggering plate 34 corresponding to a connection rod 35 of the pivot rod 33 of the securing plate 31 such that after the connection rod 35 and the pivot rod 33 are stacked, a securing nut 36 passes through the connection rod 35 and the pivot rod 33 and a spring 37, and the spring 37 causes the trigger plate 34 to tightly clip to the securing plate 31, and the clipping device 20 upon the lug 32 being mounted to the protrusion 102 of the body 1 is clipped at the spectacle 3 by means of the trigger plate 34 and the securing plate 31 to provide illumination and to provide an up and down angle adjustment of the body 1.

Figure 7:
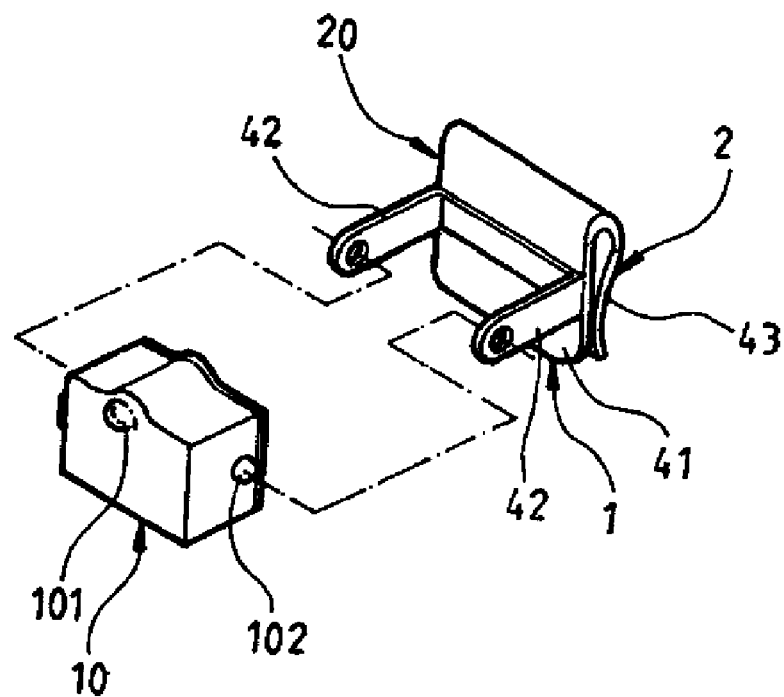
FIG. 7 is a perspective exploded view of a first preferred embodiment of the present invention.
Figure 8:
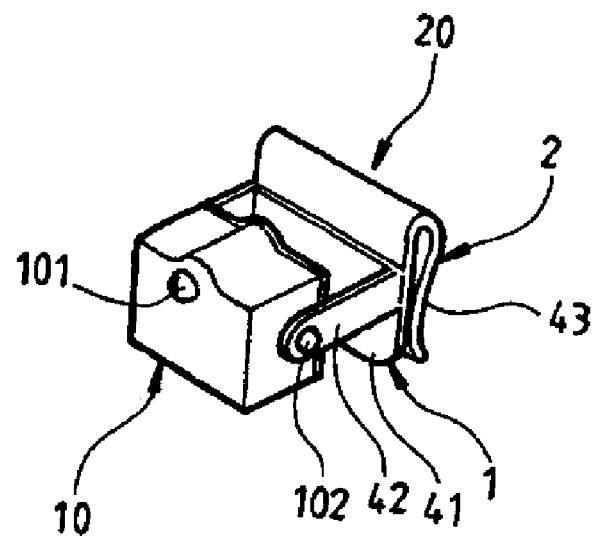
FIG. 8 is a perspective view of a preferred embodiment of the present invention.
Figure 9:
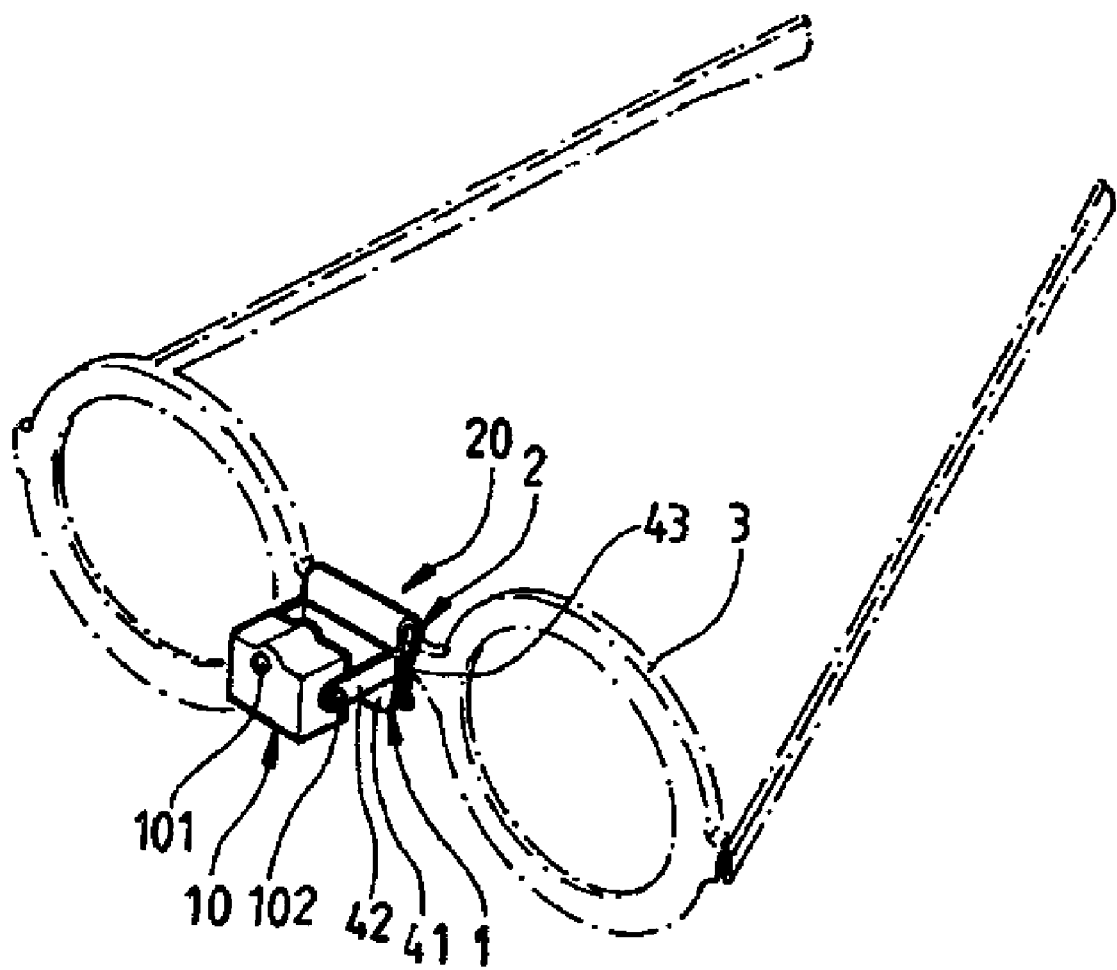
FIG. 9 is a schematic view showing the application of a third preferred embodiment of the present invention.

Referring to FIGS. 7, 8 and 9, there is shown a third preferred embodiment in accordance with the present invention. The positioning element 1 of the clipping device 20 is provided with a securing plate 41 and on the securing plate at the two lateral sides, at the front edge of the securing plate 41 are extended to form two lugs 42, the fastening element 2 is a securing plate 41 with a folded upper edge and downwardly extended to form a circular arch-shaped plate body 43. The plate body 43 has an appropriate elasticity and the plate body 43 is tightly clipped to the securing plate 41 after the lug 42 is being mounted to the protrusion 102 of the body 1, the clipping device 20 is mounted to the spectacle 3 by means of the plate body 43 and the securing plate 41 to provide illumination, and to provide an up and down angle adjustment of the body 1.

Figure 10:
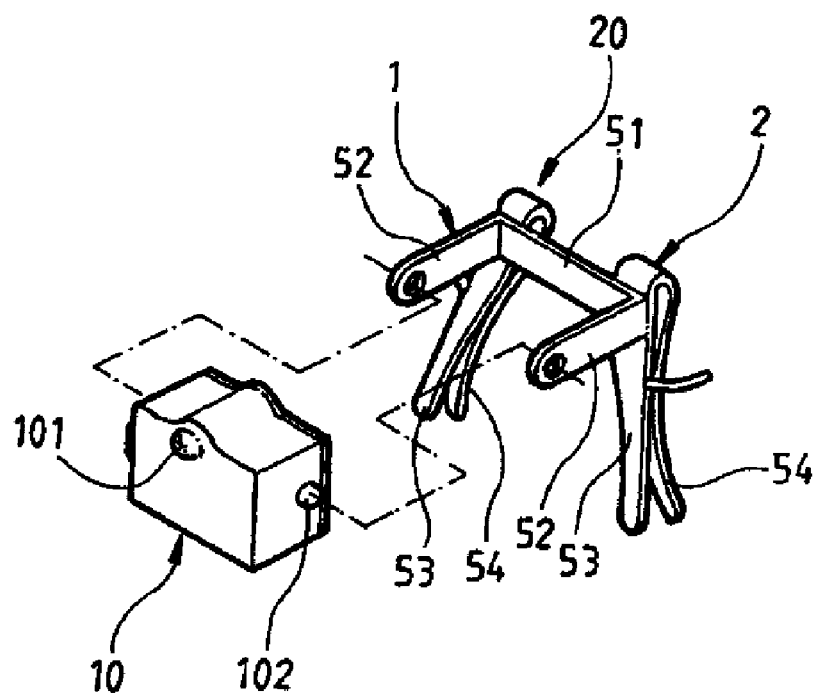
FIG. 10 is a perspective exploded view of a fourth preferred embodiment of the present invention.
Figure 11:
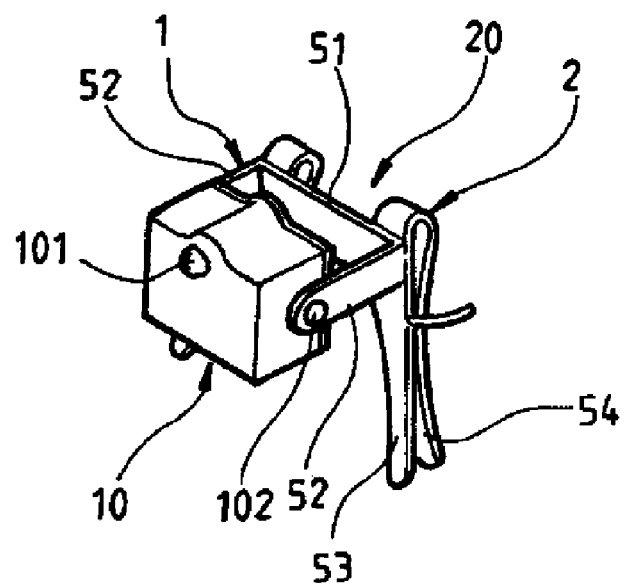
FIG. 11 is a perspective view of a fourth preferred embodiment of the present invention.
Figure 12:
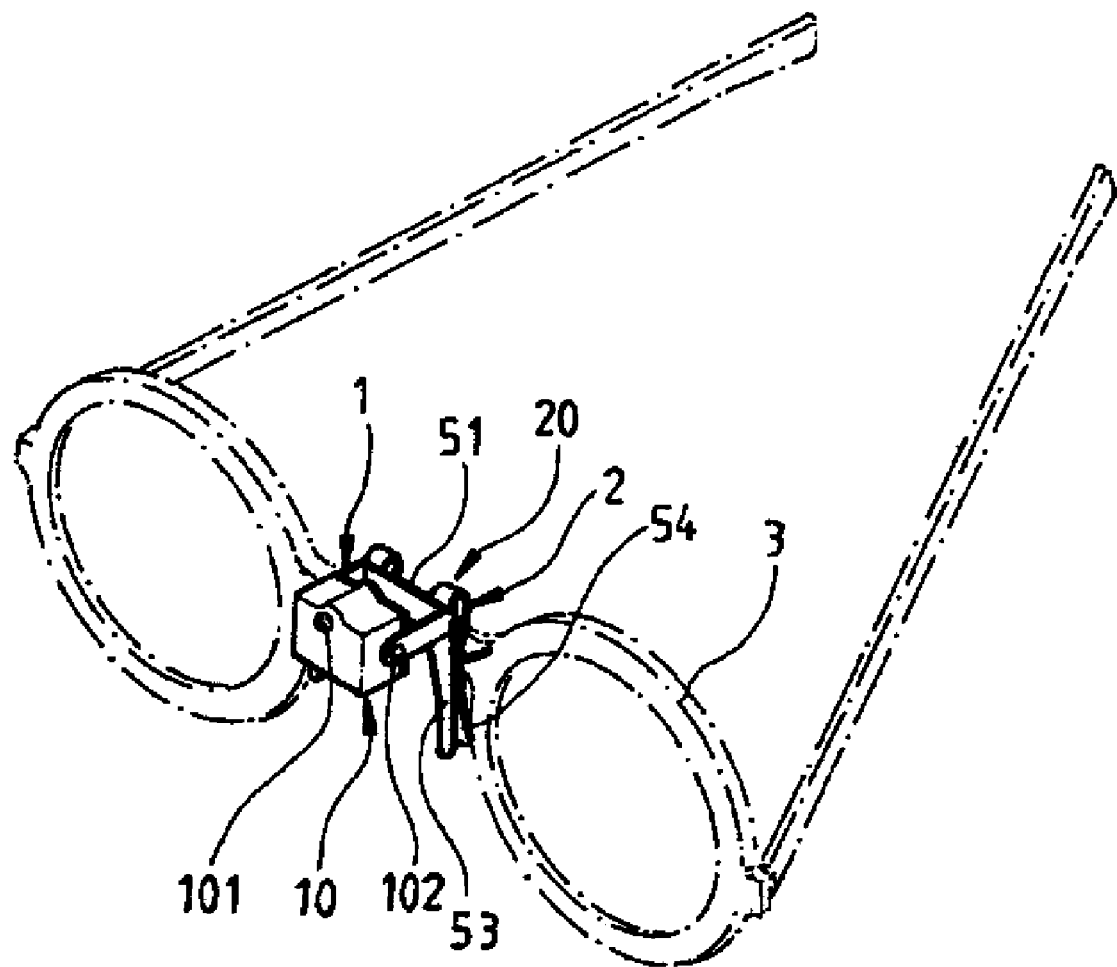
FIG. 12 is a schematic view showing the application of a fourth preferred embodiment of the present invention.

FIGS. 10, 11 and 12 illustrate a forth preferred embodiment in accordance with present invention. The positioning element 1 is provided with a securing plate 51 having two lateral sides at the front edge being extended to form two lugs 52. The fastening plate 2 is formed from two clipping plates having a front plate body 53 and a rear plate body 54, and the upper edge of the front plate body 53 is folded and downwardly extended to form a circular arch-shaped rear plate body 54 such that the two clipping plates are connected to the two ends of the securing plates 51. The rear plate body 54 of the folded plate is formed with an appropriate elasticity, and is clipped at the front plate body 53, the clipping device 20, after the lug 52 is mounted to the protrusions 102, is clipped to the spectacle 3 by means of the front plate body 53 and a rear plate body 54 to provide illumination and to provide an up and down angle adjustment of the body 1.

Figure 13:
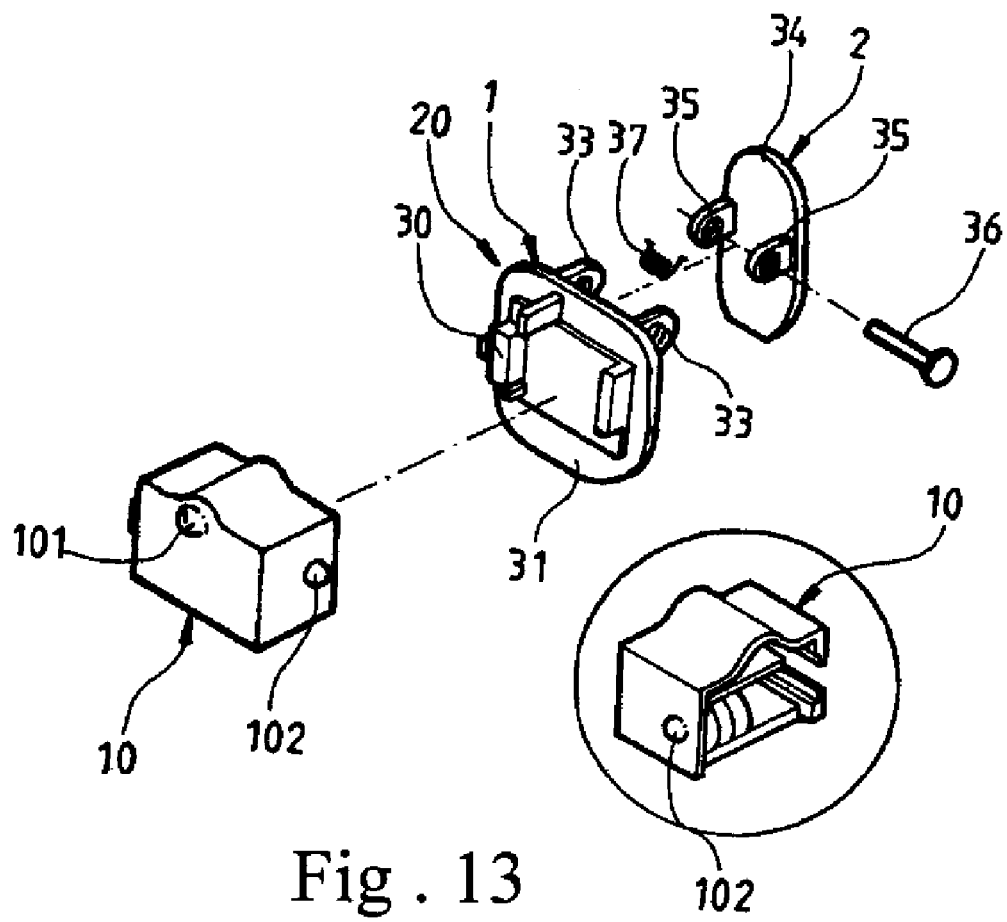
FIG. 13 is a perspective exploded view of a fifth preferred embodiment of the present invention.
Figure 14:
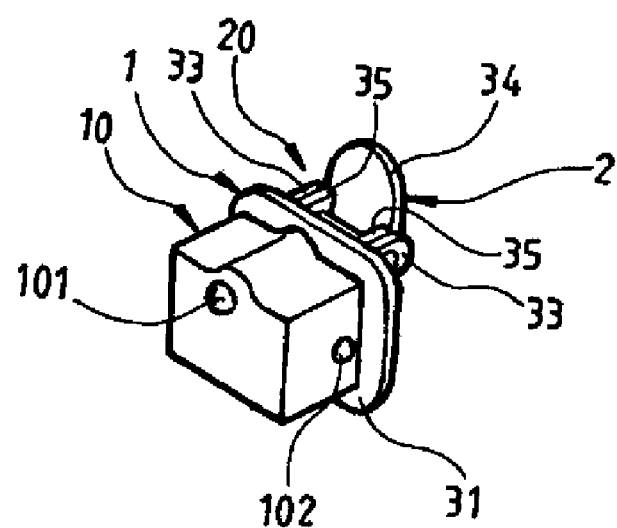
FIG. 14 is a perspective view of a fifth preferred embodiment of the present invention.

Referring to FIGS. 13 and 14, there is shown a fifth preferred embodiment in accordance with the present invention. The positioning element 1 of the clipping device 20 is provided with a securing plate 31. The front edge of the securing plate 31 is provided with a plurality of engaging plates 30, and the rear edge is provided with a pivot rod 33. The fastening element 2 is a triggering plate 34 and the triggering plate 34 is corresponding to the connection rod 35 of the pivot rod 33 such that when the connection rod 35 and the pivot rod 33 are stacked, a securing bolt 36 passes through the connection rod 35 and the pivot rod 33 and a spring 37 such that the spring 37 causes the triggering plate 34 to tightly clip to the securing plate 31 and the clipping device 20 is engaged at the rear edge of the body by means of the engaging plate 30. The triggering plate 34 and the securing plate 31 hold onto the spectacle to provide illumination.

Figure 15:
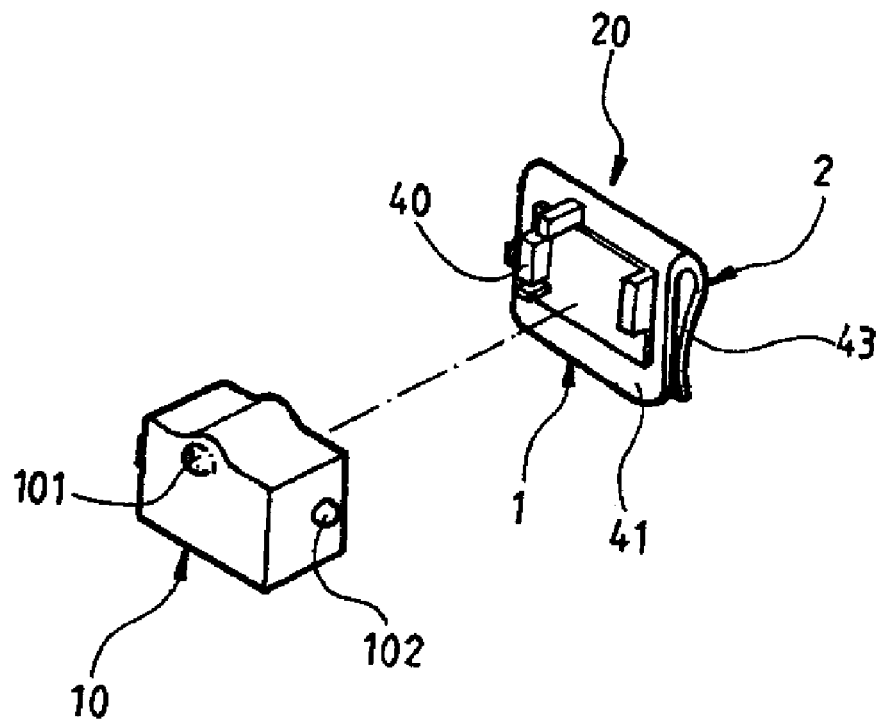
FIG. 15 is a perspective exploded view of a sixth preferred embodiment of the present invention.
Figure 16:
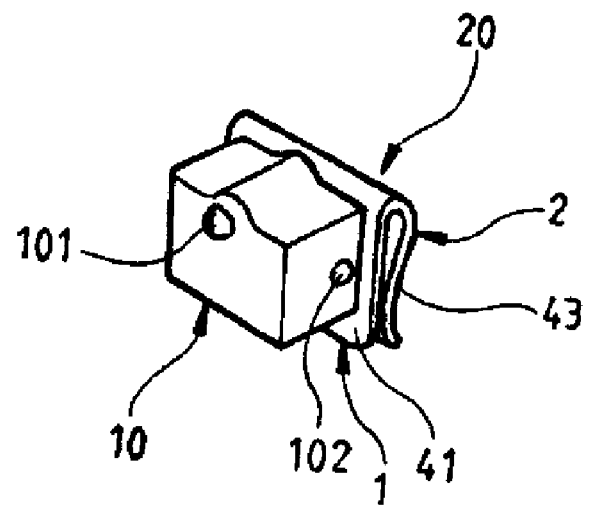
FIG. 16 is a perspective view of a sixth preferred embodiment of the present invention.

Referring to FIGS. 15 and 16, there is shown a sixth preferred embodiment of the present invention. The positioning element 1 of the clipping device 20 is provided with a securing plate 41. The front edge of the securing plate 41 is provided with a plurality of engaging plates 40 and the fastening element 2 is a circular plate body 43 being downwardly extended after the securing plate 41 is upwardly folded. The folded plate body 43 has an appropriate elasticity such that the plate body 43 is tightly clipped at the securing plate. After the clipping device 20 is engaged at the rear edge of the body of the means of the engaging plate 30, the plate body 43 and the securing plate 41 are clipped onto the spectacle 3 to provide illumination.

Figure 17:
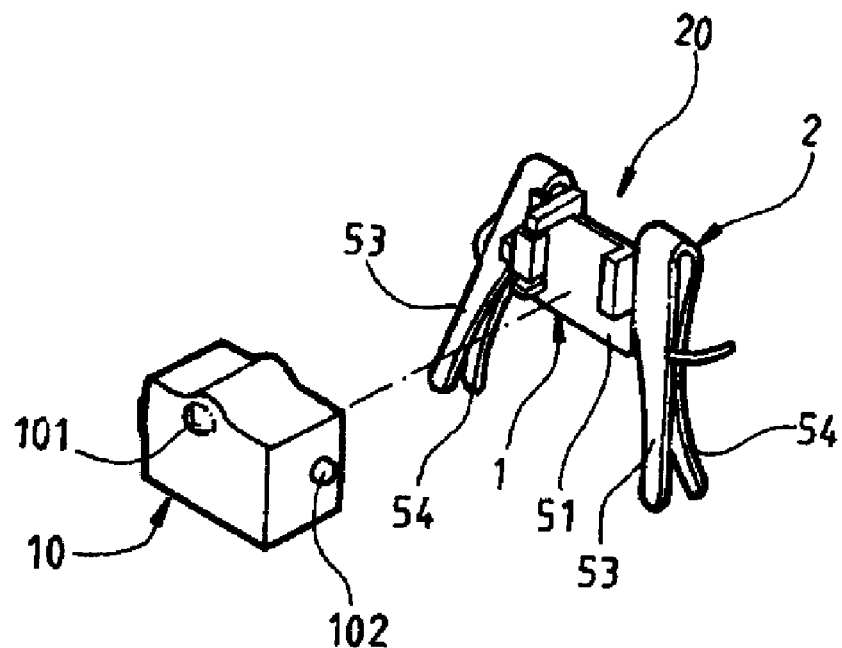
FIG. 17 is a perspective exploded view of a seventh preferred embodiment of the present invention.
Figure 18:
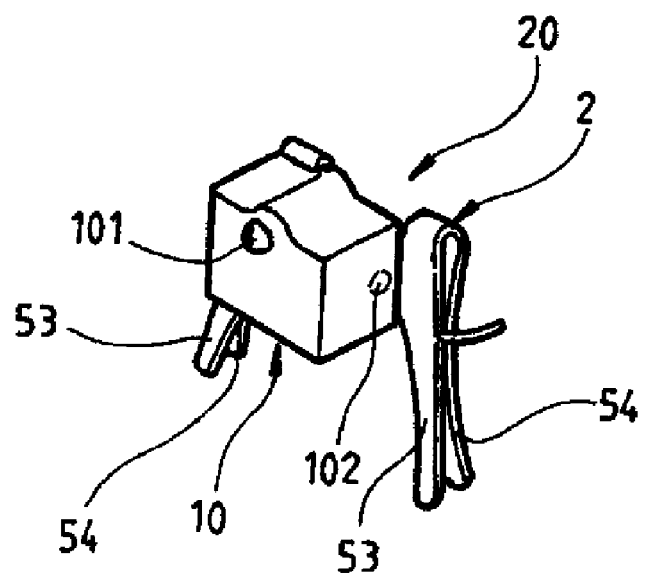
FIG. 18 is a perspective view of a seventh preferred embodiment of the present invention.

Referring to FIGS. 17 and 18, there is shown a seventh preferred embodiment in accordance with the present invention. The positioning element 1 of the clipping device 20 is provided with a securing plate 51. The front edge of the securing plate 51 is provided with a plurality of engaging plates 50. The fastening device 2 consists of two plates the front plate body 53. The upper edge of the front plate body 53 is folded and is downwardly extended to form a rear plate body 54 such that the two plates are connected at the two ends of the securing plate 51. The rear plate body 54 has an appropriate elasticity and the rear plate body 54 is tightly clipped at the front plate body such that the clipping device 20 is clipped at the rear edge of the body 1 by means of the engaging plate 50, the front plate body 53 and the rear plate body 54 clip to the spectacle 3 to provide illumination.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A spectacle with an illumination device comprising
a body having a light-emitting element at the front section of the body, and the interior section of the body containing batteries connected to the light-emitting element and protrusion at the lateral side of the body;
a clipping device comprising a positioning element and a fastening element, wherein the positioning element is provided with a seat body having forward extending lugs from the two lateral sides of the seat body and a downwardly extended securing rod, the seat body is provided with an engaging slot and the fastening element is provided with two folded clipping rods, a triggering plate links the two clipping rods such that the end section of the two clipping rods after passing through a spring, is positioned at the slot of the seat body, thereby the spring causes the clipping rod to tightly clip at the securing rod, and the lug after in engagement with the protrusion the clipping rod and the securing rod are used to hold the spectacle so as to provide an illumination and to provide an up and down angle adjustment of the body.

2. A spectacle with an illumination device comprising
a body having a light-emitting element at the front section of the body, and the interior section of the body containing batteries connected to the light-emitting element and protrusion at the lateral side of the body;
a clipping device comprising a positioning element and a fastening element, wherein the positioning element is provided with a securing plate having two lateral sides at the front edge being extended to form two lugs, and the rear edge is being mounted with a pivot rod, and the fastening element is a triggering plate corresponding to a connection rod of the pivot rod of the securing plate such that after the connection rod and the pivot rod are stacked, a securing nut passes through the connection rod and the pivot rod and a spring, and the spring causes the trigger plate to tightly clip to the securing plate, and the clipping device upon the lug being mounted to the protrusion of the body is clipped at the spectacle by means of the trigger plate and the securing plate to provide illumination and to provide an up and down angle adjustment of the body.

3. A spectacle with an illumination comprising
a body having a light-emitting element at the front section of the body, and the interior section of the body containing batteries connected to the light-emitting element and protrusion at the lateral side of the body;
a clipping device comprising a positioning element and a fastening element, wherein the positioning element being provided with two lateral sides at the front edge of the securing plate are extended to form two lugs, the fastening element is a securing plate with a folded upper edge and downwardly extended circular arch-shaped plate body, the plate body has an appropriate elasticity and the plate body is tightly clipped to the securing plate after the lug is mounted to the protrusion of the body, the clipping device is mounted to the spectacle by means of the plate body and the securing plate to provide illumination, and to provide an up and down angle adjustment of the body.

4. A spectacle with an illumination comprising
a body having a light-emitting element at the front section of the body, and the interior section of the body containing batteries connected to the light-emitting element and protrusion at the lateral side of the body;
a clipping device comprising a positioning element and a fastening element, wherein the positioning element is provided with a securing plate having two lateral sides at the front edge being extended to form two lugs, the fastening plate is formed from two clipping plates having a front plate body and a rear plate body, and the upper edge of the front plate body is folded and downwardly extended to form a circular arch-shaped plate body such that the two clipping plates are connected to the two ends of the securing plates, wherein the rear plate body of the folded plate is formed with an appropriate elasticity, and is clipped at the front plate body, and the clipping device, after the lug is mounted to the protrusions, is clipped to the spectacle by means of the front plate body and a rear plate body to provide illumination and to provide an up and down angle adjustment of the body.

* * * * *